May 30, 1933.  G. W. BILLER  1,911,423
HOSE COUPLING
Filed May 25, 1931
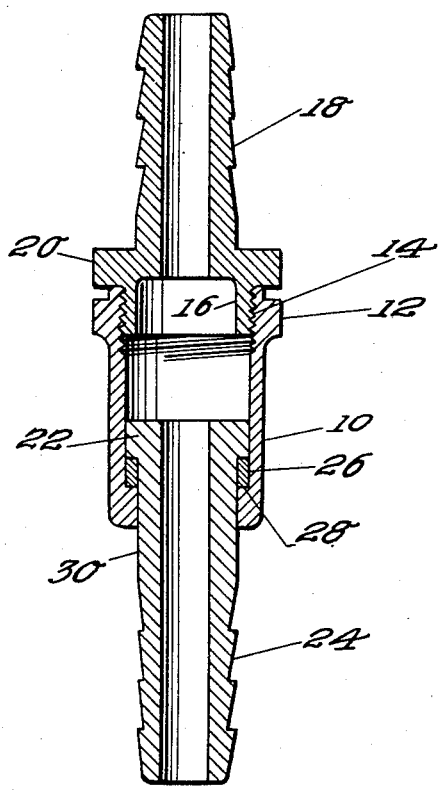
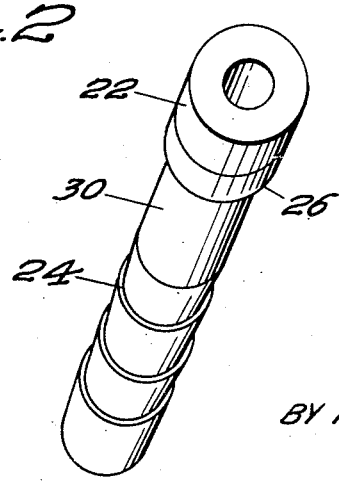
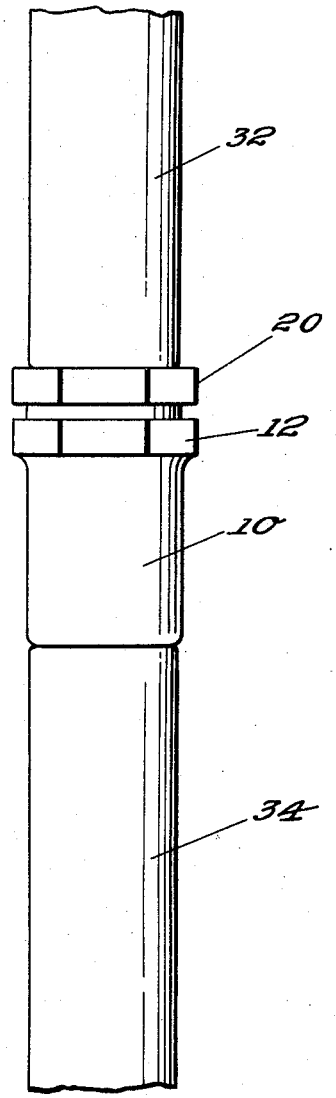
FIG.2
FIG.3
FIG.1
INVENTOR
GEORGE W. BILLER
BY HARRIETT S. BILLER
CONSERVATRIX
PER Albert J. Fihe
ATTORNEY Patented May 30, 1933

1,911,423

UNITED STATES PATENT OFFICE

GEORGE W. BILLER, MENTAL INCOMPETENT, OF BAILEY, COLORADO, BY HARRIETT S. BILLER, CONSERVATRIX, OF BAILEY, COLORADO

HOSE COUPLING

Application filed May 25, 1931. Serial No. 539,647.

This invention relates to an improved hose coupling, and has for one of its principal objects the provision of means for connecting links of hose or the like whereby a secure non-leakable connection is provided, and further whereby undesirable buckling of the hose is prevented.

One of the important objects of this invention is the provision in a hose coupling of means for so connecting two or more links of hose or the like, whether air, water, or any other kind of hose, whereby free relative rotation between the sections is permitted while at the same time any possibility of leakage at the connection is eliminated.

Another important object of this invention is to provide in a hose coupling, means for so connecting lengths of hose or tubing, particularly hose designed to carry air under pressure, that undesirable kinking, buckling, and consequent "kicking" of the hose is avoided, thereby lessening the danger of injury to the operators or users.

Other and further important objects of the invention will be apparent from the disclosures in the accompanying drawings and following specification.

The invention, in a preferred form, is shown in the drawing and hereinafter more fully described.

In the drawing:

Figure 1 is a plan view of the improved hose coupling of this invention, showing the same connecting two sections of hose, tubing, or flexible pipe.

Figure 2 is a detail sectional view of the coupling.

Figure 3 is a perspective view of the nipple.

As shown in the drawing:

The reference numeral 10 indicates generally the main portion or casing of the hose coupling, this being shaped as shown, and peripherally formed adjacent its open end in the shape of a hexagonal nut or the like as illustrated at 12. The interior of this end is screw-threaded as at 14 for the reception of a correspondingly screw-threaded male member 16, this member being formed integral with the other portion of the coupling 18. This last portion is also formed with a hexagonal nut-shaped face as illustrated at 20, thereby affording a convenient means of tightly connecting the members together.

The interior of the casing 10 is cylindrically shaped and is bored smooth to slidably and rotatably receive the upper end 22 of a nipple 24. The upper end 22 is ground so as to closely correspond to the interior cylindrical portion of the casing 10, while at the same time allow of a free rotation and sliding therein. An annular packing ring 26 surrounds the nipple portion 24 beneath the shoulder element 22 and the lower face of this packing ring is adapted to contact with an annular shoulder 28 formed in the lower end of the casing 10. The internal diameter of the opening at the lower end of the casing 10 is such as to closely correspond to a carefully ground section 30 of the nipple 24 whereby a rotatable and slidable fit is here also provided, which, however, at the same time allows of a free movement between the parts.

The extending ends of the elements 18 and 24 are annularly corrugated as illustrated in order to provide secure connections for the mounting of hose sections 32 and 34 thereon respectively.

When the sections of hose are connected by means of this coupling, and a fluid such as water or air under pressure is being carried through the hose, the nipple 24 will be forced downwardly or rearwardly in the casing 10, and the packing 26 will come into close contact with the shoulder 28. The more pressure existing in the interior of the hose line, the more close will be the contact between the packing and this shoulder, and the less possibility of leakage. Additionally, free rotation between the sections of hose at the coupling will be permitted, thereby avoiding kinks. Such kinking forms the most undesirable and actually dangerous portion of the work when operating with air lines under high pressure, such as those employed for riveting machines and the like, as the sudden straightening out of a kink in such air line sometimes results in throwing the operator a considerable distance, and if the operator is in an insecure position, it might result in his dislodgment, fall, and a consequent serious accident. By the use of this invention, kinks are automatically eliminated, as free rotation between the sections at all times is fully permitted.

Many changes may be made and numerous details of construction varied throughout a wide range without departing from the principles of this invention, and therefore, the patent granted hereon should not be limited otherwise than as necessitated by the prior art.

What is claimed is:

In a hose coupling, a tubular member, an internal flat annular shoulder at one end of said tubular member, a corresponding hose receiving element slidably and rotatably mounted for unobstructed movement in the shouldered end of said tubular member said shouldered end comprising a chamber for the reception and operation of the hose receiving element, a corresponding shoulder on the hose receiving element, a second hose receiving element screw-threadedly mounted in the other end of said tubular member, and a packing on the first hose receiving element adjacent the shoulder, said packing adapted to be forced into air and liquid-tight contact with the flat shoulder of the tubular member upon the application of pressure thereto.

In testimony whereof the inventor's signature is affixed.

GEORGE W. BILLER,
*Mental Incompetent*,
By HARRIETT S. BILLER,
*Conservatrix*.